United States Patent
Gv et al.

(10) Patent No.: US 9,827,977 B2
(45) Date of Patent: Nov. 28, 2017

(54) POWERTRAIN WITH COMPOUND-SPLIT HYBRID TRANSMISSION HAVING A REDUCED RAVIGNEAUX GEAR SET

(71) Applicant: GM GLOBAL TECHNOLOGY OPERATIONS LLC, Detroit, MI (US)

(72) Inventors: Ravikanth Gv, Karnataka (IN); Sriram Ravichandran, Karnataka (IN); Kumpatla V Naidu, Karnataka (IN); P Karthikeyan, Karnataka (IN)

(73) Assignee: GM Global Technology Operations LLC, Detroit, MI (US)

( * ) Notice: Subject to any disclaimer, the term of this patent is extended or adjusted under 35 U.S.C. 154(b) by 46 days.

(21) Appl. No.: 14/993,386

(22) Filed: Jan. 12, 2016

(65) Prior Publication Data
US 2017/0197613 A1    Jul. 13, 2017

(51) Int. Cl.
*F16H 3/44* (2006.01)
*B60W 20/20* (2016.01)
(Continued)

(52) U.S. Cl.
CPC ............ *B60W 20/20* (2013.01); *B60K 6/26* (2013.01); *B60K 6/365* (2013.01); *B60W 10/08* (2013.01); *F16H 3/663* (2013.01); *F16H 3/728* (2013.01); *F16H 37/04* (2013.01); *B60K 2006/266* (2013.01); *B60Y 2400/732* (2013.01);
(Continued)

(58) Field of Classification Search
None
See application file for complete search history.

(56) References Cited

U.S. PATENT DOCUMENTS

| | | | | |
|---|---|---|---|---|
| 8,317,648 B2 * | 11/2012 | Robinette | .............. | B60K 6/365 475/317 |
| 8,425,365 B2 * | 4/2013 | Wittkopp | ................ | F16H 3/663 475/269 |

(Continued)

FOREIGN PATENT DOCUMENTS

KR    101339268 B1 *  12/2013   ............... F16H 3/66

OTHER PUBLICATIONS

Benford et al.; "The Lever Analogy: A New Tool in Transmission Analysis"; Sae Technical Paper Series 810102, Feb. 1, 1981, Warrendale, PA USA.

*Primary Examiner* — Dirk Wright
(74) *Attorney, Agent, or Firm* — Quinn IP Law (57) ABSTRACT

A powertrain comprises a planetary gearing arrangement that includes two sun gear members, two ring gear members, a single carrier member, and an interconnecting member that connects either the two sun gear members or the two ring gear members. The powertrain includes an input member and an output member, one of which is connectable to the carrier member and the other of which is connectable to the first ring gear member. A first electric machine and a second electric machine are included in the powertrain. The second electric machine is operatively connected to the first sun gear member to drive the first sun gear member, and the first electric machine is operatively connected to drive that one of the second ring gear member and the second sun gear member which is not connected to the interconnecting member. A brake is selectively engageable to hold the input member stationary.

20 Claims, 6 Drawing Sheets

(51) Int. Cl.
  *F16H 3/66* (2006.01)
  *F16H 3/72* (2006.01)
  *F16H 37/04* (2006.01)
  *B60W 10/08* (2006.01)
  *B60K 6/365* (2007.10)
  *B60K 6/26* (2007.10)

(52) U.S. Cl.
  CPC ............... *F16H 2200/2005* (2013.01); *F16H 2200/2041* (2013.01); *Y10S 903/902* (2013.01)

(56) References Cited

U.S. PATENT DOCUMENTS

| | | | |
|---|---|---|---|
| 9,028,362 B2* | 5/2015 | He | B60K 6/105 477/3 |
| 2005/0227803 A1 | 10/2005 | Holmes | |
| 2012/0264555 A1 | 10/2012 | Robinette et al. | |
| 2014/0141928 A1* | 5/2014 | Lee | F16H 3/66 475/284 |

* cited by examiner

FIG. 16

POWERTRAIN WITH COMPOUND-SPLIT HYBRID TRANSMISSION HAVING A REDUCED RAVIGNEAUX GEAR SET

TECHNICAL FIELD

The present teachings generally include a powertrain having a planetary gearing arrangement and two electric machines.

BACKGROUND

Various hybrid and electric powertrain architectures are known for managing the input and output torques of various prime movers in hybrid vehicles, most commonly internal combustion engines and electric machines. Hybrid electric vehicles utilizing both an electric machine and an internal combustion engine as power sources often have an onboard controller programmed to vary use of each of the engine and motor/generator during different driving conditions, and can be controlled to achieve peak efficiency and/or peak performance in different operating modes.

SUMMARY

Hybrid powertrain architectures having only a single planetary gear set are advantageous for their lower cost and more compact size in comparison to hybrid powertrains having multiple planetary gear sets. A powertrain is provided herein that uses a reduced Ravigneaux gear set to achieve these objectives. The powertrain comprises a planetary gearing arrangement that includes two sun gear members, two ring gear members, a common carrier (i.e., single carrier member), and an interconnecting member that connects either the two sun gear members or the two ring gear members to rotate in unison. The powertrain includes an input member and an output member, one of which is connectable to the carrier member and the other of which is connectable to the first ring gear member to rotate in unison. A first electric machine and a second electric machine are included in the powertrain. The second electric machine is operatively connected to the first sun gear member to drive the first sun gear member, and the first electric machine is operatively connected to drive one of the second ring gear member and the second sun gear member not connected to the interconnecting member.

For example, in one embodiment, referred to as a common ring embodiment, the interconnecting member connects the first and the second ring gear members, the input member is connectable to the carrier member, the output member is connectable to the first ring gear member, the first electric machine is operatively connected to the second sun gear member, and the second electric machine is operatively connected to the first sun gear member. In another common ring embodiment, the interconnecting member connects the first and the second ring gear members, the output member is connectable to the carrier member, the input member is connectable to the first ring gear member, the first electric machine is operatively connected to the second sun gear member, and the second electric machine is operatively connected to the first sun gear member.

In another embodiment, referred to as a common sun embodiment, the interconnecting member connects the first and the second sun gear members, the input member is connectable to the carrier member, the output member is connectable to the first ring gear member, the first electric machine is operatively connected to the second ring gear member, and the second electric machine is operatively connected to the first sun gear member. In another common sun embodiment, the interconnecting member connects the first and the second sun gear members, the input member is connectable to the first ring gear member, the output member is connectable to the carrier member, the first electric machine is operatively connected to the second ring gear member, and the second electric machine is operatively connected to the first sun gear member A controller is operatively connected to the first electric machine and to the second electric machine. A brake is selectively engageable to hold the input member stationary. The controller is configured to control the first and the second electric machines to function in a compound-split operating mode when the input member is driven and the brake is not engaged, and to function in an all-electric operating mode when the brake is engaged. In various embodiments, the first and the second electric machines may be controlled to predetermined speeds to cause the input member to be stationary when the brake is engaged.

The above features and advantages and other features and advantages of the present teachings are readily apparent from the following detailed description of the best modes for carrying out the present teachings when taken in connection with the accompanying drawings.

DETAILED DESCRIPTION

Figure 1:
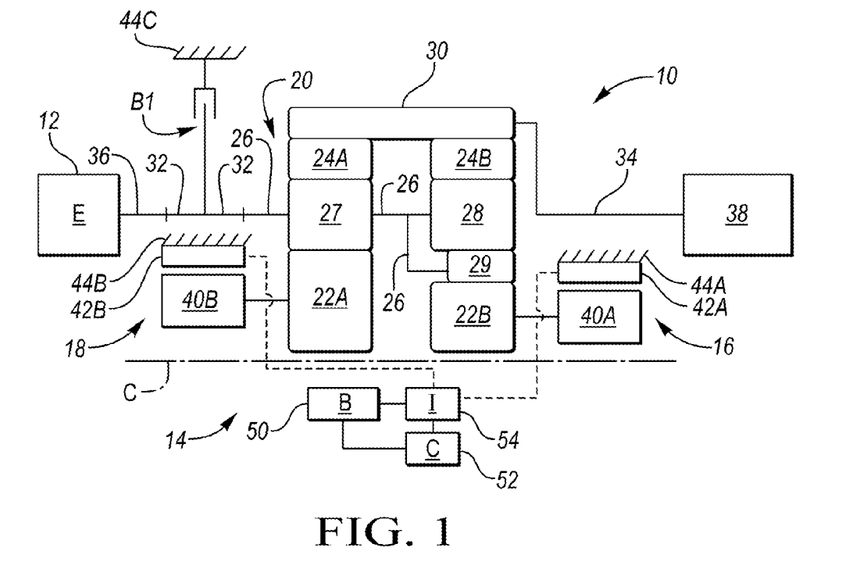
FIG. 1 is a schematic illustration of a first embodiment of a powertrain having a planetary gearing arrangement and two electric machines and showing an engine and a final drive.

Referring to the drawings, FIG. 1 shows a hybrid powertrain 10 for a vehicle. The hybrid powertrain 10 includes a prime mover, such as an internal combustion engine 12, labeled E, connected with a hybrid transmission 14. Other types of prime movers, such as fuel cells, pneumatic engines, etc. may be used in place of an internal combustion engine 12. The hybrid transmission 14 includes two additional motive sources, a first electric machine 16 and a second electric machine 18. The engine 12 and electric machines 16 and 18 are interconnectable via a planetary gearing arrangement 20 and selective engagement of a brake B1 to provide various operating modes as discussed herein.

The planetary gearing arrangement 20 includes two sun gear members 22A and 22B, two ring gear members 24A and 24B, and a single carrier member 26 that supports a first, a second, and a third set of pinion gears 27, 28, and 29, respectively, as described herein. The planetary gearing arrangement 20 also includes an interconnecting member 30 that connects the two ring gear members 24A, 24B to rotate in unison. In some of the other embodiments discussed herein, the interconnecting member 30 connects the two sun gear members 22A, 22B. Such a planetary gearing arrangement is referred to herein as a "reduced Ravigneaux gear set" as, due to the interconnecting member, the planetary gear set 20 has only four nodes instead of five nodes of a full Ravigneaux gear set. As used herein, two components "rotate in unison" when they are operatively connected to one another such that they rotate together at the same speed, including at zero speed (i.e., when they are stationary together).

The first ring gear member 24A radially surrounds the first sun gear member 22A. The second ring gear member 24B radially surrounds the second sun gear member 22B. The first set of pinion gears 27 mesh with the first sun gear member 22A and with the first ring gear member 24A. The second set of pinion gears 28 mesh with the second ring gear member 24B and the third set of pinion gears 29. The third set of pinion gears 29 mesh with the second set of pinion gears 28 and with the second sun gear member 22B. Only one pinion gear of each of the sets of pinion gears 27, 28, and 29 is shown in FIG. 1. Those skilled in the art will readily understand that FIG. 1 shows only a portion of the planetary gearing arrangement 20 and only a portion of the electric machines 16, 18 above a centerline C of the gearing arrangement 20.

The hybrid transmission 14 also includes an input member 32 and an output member 34. The input member 32 is connected to rotate in unison with the carrier member and the output member 34 is connected to the interconnecting member 30 to rotate in unison with the first ring gear member 24A and with the second ring gear member 24B. A drive member 36, such as a crankshaft, of the engine 12 is connected with the input member 32 so that the drive member 36 rotates in unison with the input member 32. Optionally, a ratio multiplying connection to the drive member 36, such as a geared connection or a series of pulleys and sprockets may operatively connect the drive member 36 and the input member 32. Optionally, a dampener may be positioned between the drive member 36 and the input member 32. Optionally, a selectively engageable clutch may be positioned between the drive member 36 and the input member 32.

The output member 34 is connected through a final drive mechanism 38 to vehicle wheels (not shown) to provide tractive power to the wheels to propel the vehicle. The planetary gearing arrangement 20 is the only gearing arrangement that is operatively connected or connectable between the input member 32 and the output member 34. Optionally, a selectively engageable clutch may be positioned between the output member 34 and the final drive mechanism 38.

The first electric machine 16 includes a first rotor 40A that is continuously operatively connected to rotate in unison with the second sun gear member 22B of the planetary gear set 20. The first rotor 40A thus drives the second sun gear member 22B when the first electric machine 16 operates as a motor. The first electric machine 16 also includes a first stator 42A that radially surrounds the first rotor 40A. The first stator 42A is grounded to a stationary member 44A such as a motor housing of the first electric machine 16 or to a different stationary member.

The second electric machine 18 includes a second rotor 40B and a second stator 42B that radially surrounds the rotor 40B. The second stator 42B is grounded to a stationary member 44B such as a motor housing of the second electric machine 18 or to a different stationary member. The second rotor 42B is operatively connected to the first sun gear member 22A so that the second rotor 42B drives the first sun gear member 22A when the second electric machine 18 operates as a motor. Both of the electric machines 16, 18 are motor/generators that are selectively operable both as a motor and as a generator.

The stators 42A, 42B of the electric machines 16 and 18 are operatively connected to an energy storage device 50 that may be one or more batteries, labeled B in FIG. 1. Other electric storage devices that have the ability to store electric power and dispense electric power may be used in place of the batteries. A controller 52, labeled C in FIG. 1, is operatively connected to the electric machines 16 and 18 and monitors the speed of the rotors 40A, 40B. The controller 52 also receives information regarding engine speed, either from a separate engine controller, or by connection to the engine 12. Based on this and other vehicle operating conditions, such as driver accelerator commands, the controller 52 is operable to provide electrical energy from the energy storage device 50 through a power inverter 54, labeled I in FIG. 1, to either or both electric machines 16 and 18 to cause the electric machines 16, 18 to function as motors, adding torque to the transmission 14. The power inverter 54 converts direct current to alternating current when electrical power is provided to the electric machines 16 and/or 18.

If the information received by the controller 52 indicates that either electric machine 16 or 18 should be operated as a generator, converting mechanical energy into electrical energy, the controller 52 is operable to cause the power inverter 54 to convert alternating current provided from either electric machine 16 or 18 into direct current stored in the energy storage device 50. The lines in FIGS. 1 and 2 connecting the electric machines 16, 18, the energy storage device 50, the controller 52, the inverter 54, and stator windings of the stators 42A, 42B represent transfer conductors for relaying electrical current or signals between the components.

Optionally, instead of a single controller 52, each electric machine 16, 18 can have a separate, integrated controller and inverter, with the separate controllers of the electric machines 16, 18 operatively connected to one another.

A brake B1 is selectively engageable to hold the input member 32 stationary. More specifically, the brake B1 is selectively engageable to ground the input member 32 to a stationary member 44C, which may be the same or a different stationary member than the stationary member 44A or 44B. The brake B1 can be controlled by the same controller 52, or may be controlled by a separate transmission controller, not shown, that is operatively connected with the controller 52 and with a separate engine controller. The brake B1 can be actuated in any suitable manner, such as hydraulically, electrically, or electro-magnetically. As further described herein, the brake B1 is engaged when the powertrain 10 is controlled to provide an all-electric operating mode, in which the electric machines 16, 18 function as motors to drive the output member 34, and is not engaged when the engine 12 is on and drives the input member 32 while the electric machines 16, 18 are each controlled to function as a motor or as a generator to provide a compound-split operating mode.

Figure 2:
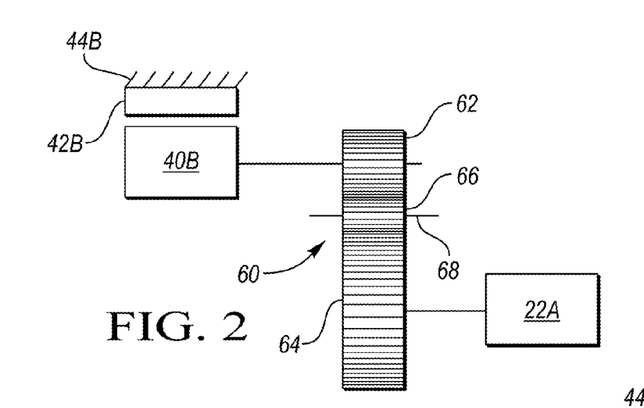
FIG. 2 is a schematic illustration in fragmentary view of a portion of an alternative connection of an electric machine in the powertrain of FIG. 1.

FIG. 2 shows an optional reduction gear set 60 that may be used to connect the second rotor 40B to the first sun gear member 22A to provide speed reduction or torque reduction. The reduction gear set 60 has a first gear 62 connected to rotate in unison with the second rotor 40B, a second gear 64 connected to rotate in unison with the first sun gear member 22A, and an idler gear 66 meshing with both the first gear 62 and the second gear 64. For example, the gears 62, 64, 66 may be helical gears. The idler gear 66 rotates about a separate axis 68 and enables both first and second gears 62 and 64 to rotate in the same direction so that the reduction gear set 60 does not change the direction of rotation of the first sun gear member 22A relative to the second rotor 40B. The second rotor 40B of the electric machine 18 will be centered about a separate axis from the axis (i.e., the centerline C) of the planetary gear set 20.

In the embodiment shown, the first gear 62 is configured to have a smaller diameter and fewer teeth than the second gear 64. Accordingly, speed reduction and torque multiplication occurs when torque is transferred from the electric machine 18 to the first sun gear member 22A. That is, the rotor 40B rotates faster than the first sun gear member 22A. The speed reduction aids with electric launch as discussed herein. In other embodiments, the first gear 62 could be configured to have a larger diameter and more teeth than the second gear 64, enabling speed multiplication and torque reduction, if needed for a particular application.

Figure 3:
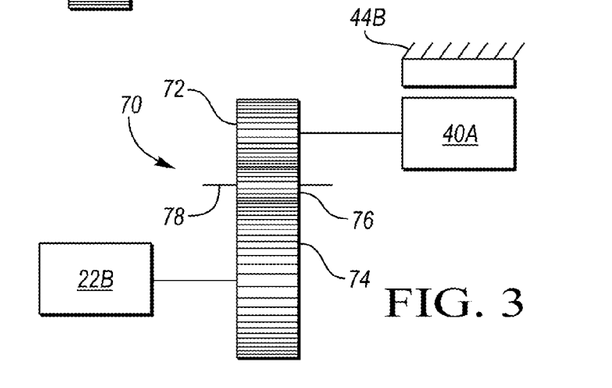
FIG. 3 is a schematic illustration in fragmentary view of a portion of an alternative connection of an electric machine in the powertrain of FIG. 1.

Similarly, FIG. 3 shows an optional reduction gear set 70 that may be used to connect the first rotor 40A to the second sun gear member 22B to provide speed reduction and torque multiplication. The reduction gear set 70 has a first gear 72 connected to rotate in unison with the first rotor 40A, a second gear 74 connected to rotate in unison with the second sun gear member 22B, and an idler gear 76 meshing with the both the first gear 72 and the second gear 74. For example, the gears 72, 74, 76 may be helical gears. The idler gear 76 rotates about a separate axis 78 and enables both first and second gears 72 and 74 to rotate in the same direction so that the reduction gear set 70 does not change the direction of rotation of the second sun gear member 22B relative to the first rotor 40A. The first rotor 40A of the electric machine 16 will be centered about a separate axis from the axis (i.e., the centerline C) of the planetary gear set 20.

The first gear 72 is configured to have a smaller diameter and fewer teeth than the second gear 74. Accordingly, speed reduction and torque multiplication occurs when torque is transferred from the electric machine 16 to the second sun gear member 22B. That is, the rotor 40A rotates faster than the second sun gear member 22B. The speed reduction aids with electric launch as discussed herein. In other embodiments, the first gear 72 could be configured to have a larger diameter and more teeth than the second gear 74, enabling torque reduction and speed multiplication, if needed for a particular application.

Figure 4:
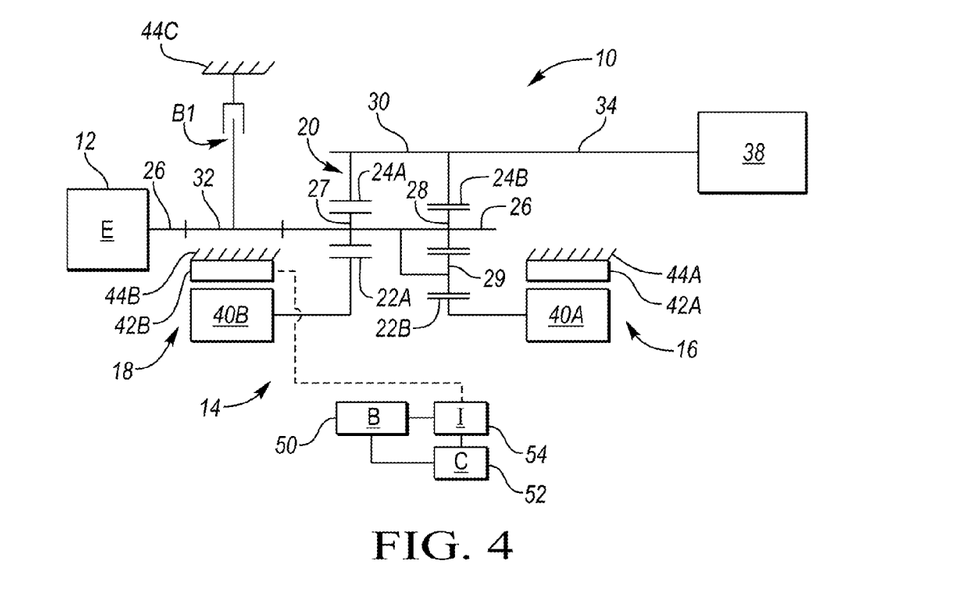
FIG. 4 is a schematic illustration of the powertrain of FIG. 1 as a stick diagram.
Figure 5:
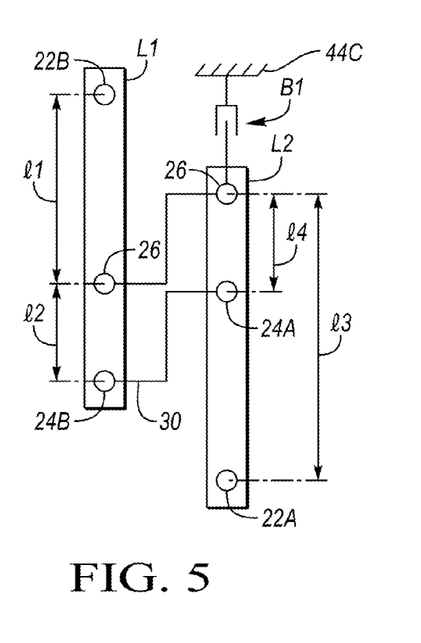
FIG. 5 is a schematic lever diagram of the planetary gearing arrangement of FIG. 1 with a brake of FIG. 1.
Figure 6:
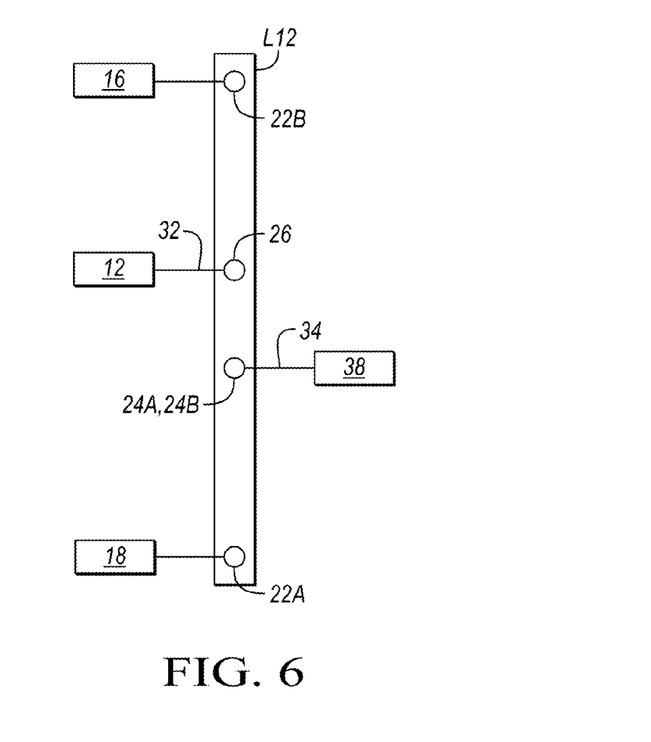
FIG. 6 is a schematic lever diagram of the planetary gearing arrangement of FIG. 5 in collapsed form with the electric machines, the engine, and the final drive connected to the lever diagram.

FIG. 4 shows the powertrain 10 of FIG. 1 in stick diagram form. FIG. 5 shows the planetary gearing arrangement 20 in lever diagram form and illustrates the position of the brake B1. Those of ordinary skill in the art understand the correspondence between a transmission shown in lever diagram form and a transmission shown in stick diagram form. A lever diagram is a schematic representation of the components of a mechanical device such as an automatic transmission. Each individual lever may represent an individual planetary gear set, a compound planetary gear arrangement having two or more interconnected planetary gear sets, or an external gear set. In the planetary gear set lever, the three basic mechanical components of the subject gear set, i.e., the sun gear member, the carrier member, and the ring gear member, are each represented by a junction point, also referred to herein as a node, on the particular lever. Therefore, a typical single planetary gear set lever contains three junction points: one for the sun gear member, one for the carrier member, and one for the ring gear member. The relative length between the junction points of each planetary gear set lever can be used to represent the ring-to-sun gear ratio of each respective gear set. These lever ratios, in turn, are used to vary the gear ratios of the transmission in order to achieve appropriate ratios and ratio progression. Mechanical couplings or interconnections between the junction points of the various planetary gear sets are illustrated by thin, horizontal lines and torque transmitting devices such as clutches and brakes are presented as interleaved fingers. If the device is a brake, one set of the fingers is grounded. In FIG. 5, for purposes of illustration only, the planetary gearing arrangement 20 is represented as two levers L1, L2, with the single carrier member 26 represented as a separate node in each of the two levers L1, L2. In general, as known by those skilled in the art, the levers L1, L2 can instead be represented as a four-junction point lever L12, as shown in FIG. 6, two to the common carrier member 26 and the interconnecting member 30 providing a fixed connection, i.e., pairing, between the ring gear members 24A, 24B. With the common carrier member 26 and the interconnecting member 30, the maximum number of separately rotating inertias (about a common central axis) is reduced from six to four, and the total degrees of freedom from four to two. Thus constrained, the planetary gearing arrangement 20 provides, in order of rotational speed, first, second, third, and fourth junction points. However, as understood by those skilled in the art, various compound planetary gearing arrangements may be constructed to provide a four-junction point lever that will accomplish such a result, and place them within the scope of the lever diagram of FIG. 6.

The relative length between the junction points of each planetary gear set lever can be used to represent the ring-to-sun gear ratio of each respective gear set. For example, the length l1 between the nodes representing the second sun gear member 22B and the carrier member 26 is proportional to the number of teeth of the second ring gear member 24B, while the length l2 between the nodes representing the carrier member 26 and the second ring gear member 24B is proportional to the number of teeth of the second sun gear member 22B. Similarly, the length l3 between the nodes representing the first sun gear member 22A and the carrier member 26 is proportional to the number of teeth of the first ring gear member 24A, while the length l4 between the nodes representing the first ring gear member 24A and the carrier member 26 is proportional to the number of teeth of the first sun gear member 22A. The electric machines 16, 18 are expected to have higher rotational speeds than the input member 32 and the output member 34. As best illustrated in FIG. 6, in this embodiment, because the electric machines 16, 18 are connected to the sun gear members 22A, 22B which have a relatively small radius, pitch line velocities on those nodes fall within predetermined limits. With this arrangement, a first mechanical point (i.e., a point where the speed of one of the electric machines 16 or 18 is zero) will occur at an underdrive speed ratio (i.e., a speed ratio where the speed of the output member 34 is less than the speed of the input member 32) having a numerical value dependent on the tooth ratio of the ring gear member 24A to the sun gear member 22A and the tooth ratio of the ring gear member 24B to the sun gear member 22B. A second mechanical point will occur at an overdrive speed ratio (i.e., a speed ratio where the speed of the output member 34 is greater than the speed of the input member 32) having a numerical value dependent on the tooth ratio of the ring gear member 24A to the sun gear member 22A and the tooth ratio of the ring gear member 24B to the sun gear member 22B.

Figures 7, 8:
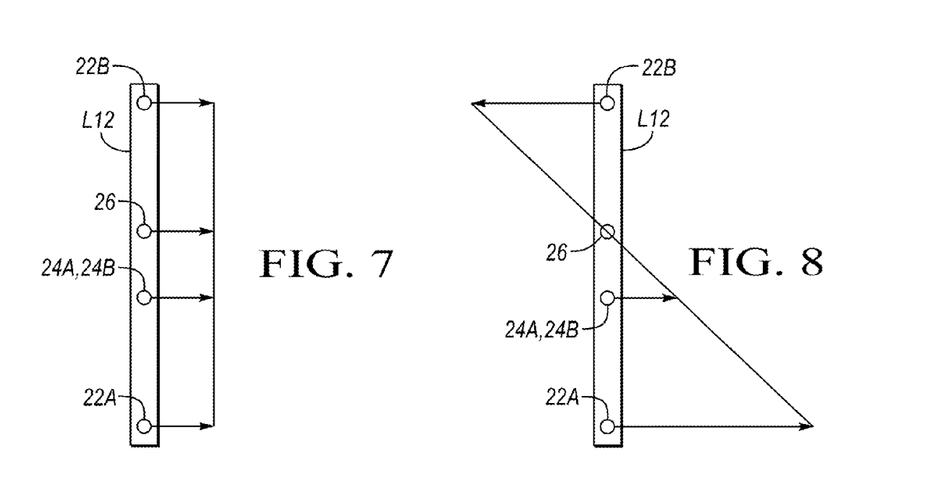
FIG. 7 shows the schematic lever diagram of FIG. 6 represented in a compound-split operating mode.
FIG. 8 shows the schematic lever diagram of FIG. 6 represented in an all-electric operating mode.
Figure 9:
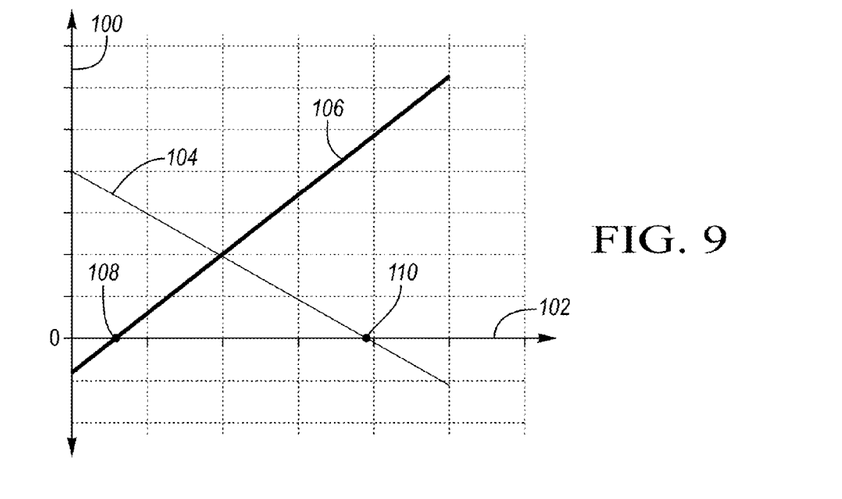
FIG. 9 is a plot of electric machine speeds versus output speed at constant engine speed for the powertrain of FIG. 1 in a compound-split operating mode.

FIG. 7 shows arrows that illustrate the direction of rotation of the various components of the planetary gearing arrangement 20 represented by the various junction points when the powertrain 10 is controlled to operate in a compound-split operating mode. In the compound-split operating mode, the engine 12 is on and can be controlled to operate at its most efficient speed, if desired. The brake B1 is not engaged. The electric machines 16, 18 are controlled to function as motors or generators, as best shown in FIG. 9, as necessary to enable the engine 12 to maintain a constant rotational speed while the speed and torque required at the output member 34 varies to meet operator demand. A compound-split operating mode is beneficial for efficient operation during high-speed driving, as it allows for reduced motor speeds and decreased power through the electrical power path. That is, all of the mechanical power is not converted to electrical power, then converted again to mechanical power through electric machines as is the case in a series operating mode.

A compound-split operating mode requires four planetary gear members that are not connected for common rotation with one another but that are connected with one another through planetary gearing (i.e., a member (carrier member 26) connected for rotation with the input member 32, a member (first sun gear member 22B) connected for rotation with the first motor/generator 16, a member (second sun gear members 18) connected for rotation with the second motor/generator 18, and a member (interconnected ring gear members 24A, 24B) connected for rotation with the output member 34.

In the compound-split operating mode, the engine 12 provides torque at the carrier member 26, the first electric machine 16 provides torque to or receives torque from the second sun gear member 22B, and the second electric machine 18 provides torque to or receives torque from the first sun gear member 22A. The speeds of the engine 12 and the output member 34 are functions of the speeds of the first and second electric machines 16, 18.

When the brake B1 is engaged, the all-electric operating mode is established. As shown in FIG. 8, when the brake is engaged, the carrier member 26 is held stationary. In one non-limiting example, during a transition from the compound-split operating mode to the all-electric operating mode, the electric machines 16, 18 are controlled to bring the carrier member 26 to a speed of zero, without affecting the speed or torque of the output member 34, just prior to engagement of the brake B1 so that the speed of the input member 32 is zero when the brake B1 is engaged. Slip is thus avoided. As indicated in FIG. 8, the first electric machine 16 is controlled to provide a speed and a direction of rotation at the second sun gear member 22B that is opposite to that of the output member 34 and the first sun gear member 22A. The speed of the second electric machine 18 is increased to increase the speed of the first sun gear member 22A in the same direction of rotation as the output member 34. The all-electric mode may be implemented under various operating conditions. For example, the all-electric mode may be implemented during forward cruising.

FIG. 9 is a plot of motor speed in revolutions per minute (rpm) on the Y-axis 100 versus speed of the output member 34 (in rpm) on the X-axis 102 while the speed of the engine 12 and the input member 32 is kept constant at a positive speed during the compound-split operating mode. Line 104 is the speed of the first electric machine 16. Line 106 is the speed of the second electric machine 18. There are two mechanical points, a first mechanical point 108, and a second mechanical point 110 during the example compound-split operating mode. A "mechanical point" means that the rotor 40A or 40B of either of the electric machines 16, 18 is stationary at any time during operation of the powertrain 10. Maximum mechanical efficiency in the transfer of power from the engine 12 to the final drive mechanism 38 occurs when one of the rotors 40A, 40B is at a mechanical point—i.e.: stationary. At the first mechanical point 108, the rotor 40B is stationary. At the second mechanical point 110, the rotor 40A is stationary.

Figure 10:
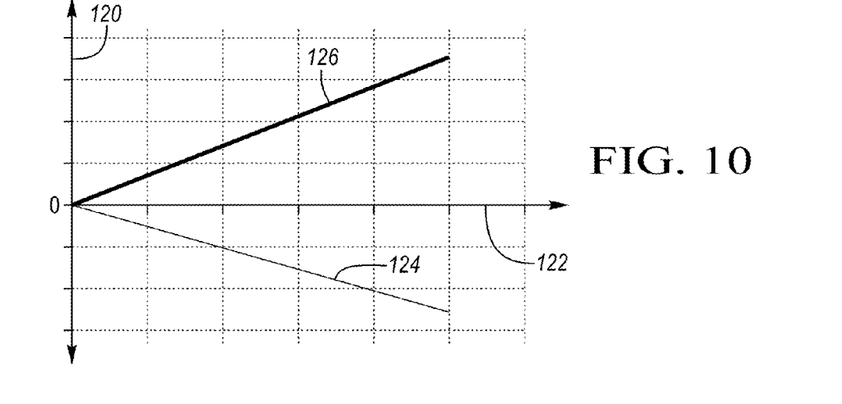
FIG. 10 is a plot of electric machine speeds versus output speed at an engine speed of zero for the powertrain of FIG. 1 in an all-electric operating mode.

FIG. 10 is a plot of motor speed in revolutions per minute (rpm) on the Y-axis 120 versus speed of the output member 34 (in rpm) on the X-axis 122 while the engine 12 is off (i.e., the speed of the engine 12 is zero, or if a disconnect clutch is provided, the engine output member 26 is disconnected from the input member 32). The brake B1 is engaged so that the speed of the input member 32 is zero. Line 124 is the speed of the first electric machine 16. Line 126 is the speed of the second electric machine 18. The first electric machine 16 is controlled to rotate in an opposite direction than the second electric machine 18. Both electric machines 16, 18 operate as motors in the all-electric operating mode, using stored energy provided from the energy storage device 50.

Figure 11:
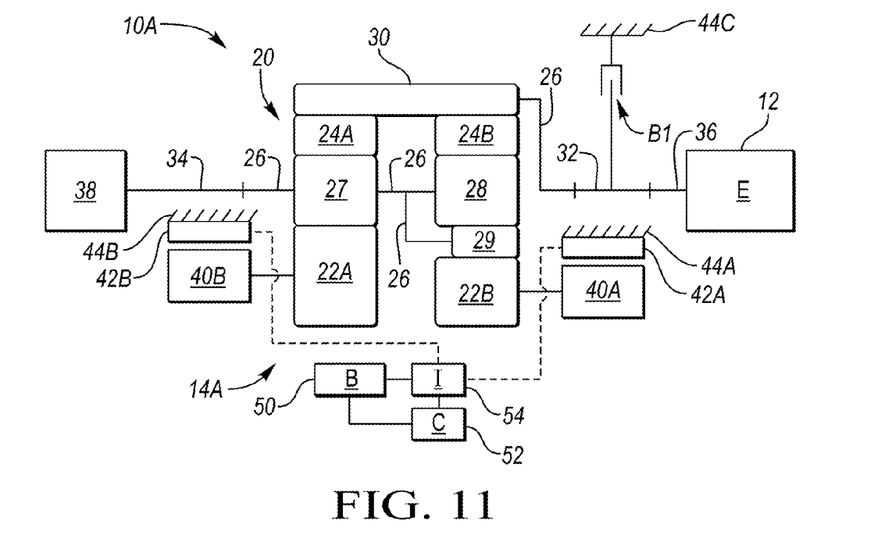
FIG. 11 is a schematic illustration of a second embodiment of a powertrain having a planetary gearing arrangement and two electric machines and showing an engine and a final drive.

FIG. 11 shows an alternative embodiment of a powertrain 10A that has a hybrid transmission 14A with the same components as the hybrid transmission 14 in the powertrain 10, but has the output member 34 connectable to the carrier member 26, and the input member 32 connectable to the first ring gear member 24A and the second ring gear member 24B via the interconnecting member 30. In other words, the positions of the input member 32 and the output member 34 are switched relative to the powertrain 10. The powertrain 10A and the powertrain 10 will have different effects on fuel economy and performance due to the different ratios of the speed of the input member 32 to the speed of the output member 34 achieved by each. As with the powertrain 10, either or both of the reduction gear sets 60 or 70 may be used between the electric machines 16, 18 and the sun gear members 22A, 22B, respectively. The powertrain 10A is operable in the compound-split operating mode and is operable in the all-electric operating mode as described with respect to the powertrain 10.

Figure 12:
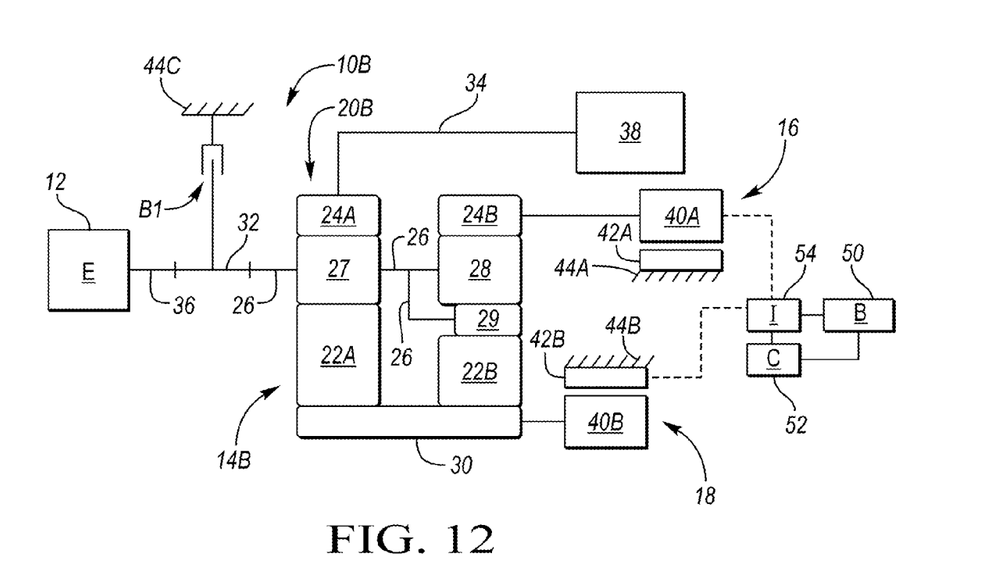
FIG. 12 is a schematic illustration of a third embodiment of a powertrain having a planetary gearing arrangement and two electric machines and showing an engine and a final drive.
Figure 16:
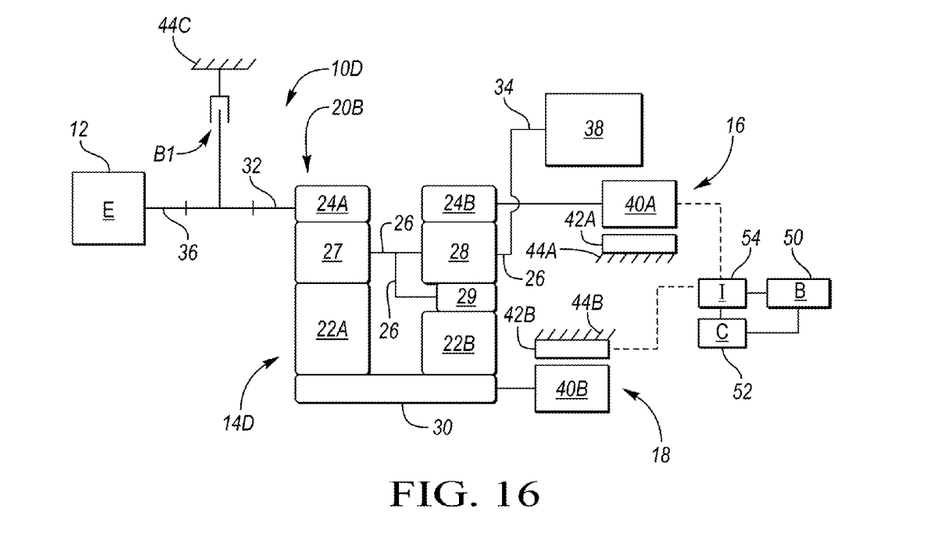
FIG. 16 is a schematic illustration of a fifth embodiment of a powertrain having a planetary gearing arrangement and two electric machines and showing an engine and a final drive.

FIG. 12 shows an alternative embodiment of a powertrain 10B that has a hybrid transmission 14B with the same components as the hybrid transmission 14 in the powertrain 10. The first sun gear member 22A and the second sun gear member 22B connected to rotate in unison via the interconnecting member 30, rather than the first ring gear member 24A and the second ring gear member 24B. The powertrain 10B may thus be referred to as a common sun gear embodiment. The input member 32 is connectable to the carrier member 26. The output member 34 is connectable to the first ring gear member 24A, and in the embodiment shown is connected to rotate in unison with the first ring gear member 24A. The first electric machine 16 is operatively connected to drive the second ring gear member 24B. The second electric machine 18 is operatively connected to drive the first sun gear member 22A and the second sun gear member 22B via the interconnecting member 30. FIG. 16 shows another possible common sun gear embodiment of a powertrain 10D with a hybrid transmission 14D. The powertrain 10D is identical to the powertrain 10B and the hybrid transmission 14D is identical to the hybrid transmission 10D except that the input member 32 is connectable to the first ring gear member 24A and the output member 34 is connectable to the carrier member 26.

As with the powertrain 10, the speed reducing gear set 70 of FIG. 3 may be used between the electric machine 16 and the ring gear member 22A. The speed reducing gear set 60 of FIG. 2 may be used between the electric machine 18 and the interconnecting member 30. The powertrain 10B is operable in the compound-split operating mode and is operable in the all-electric operating mode as described with respect to the powertrain 10.

Figure 13:
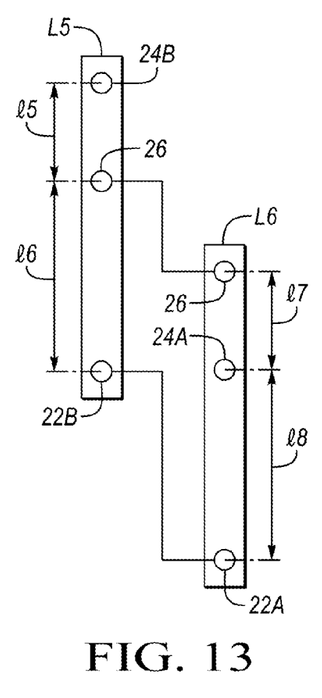
FIG. 13 is a schematic lever diagram of the planetary gearing arrangement of FIG. 12.
Figure 14:
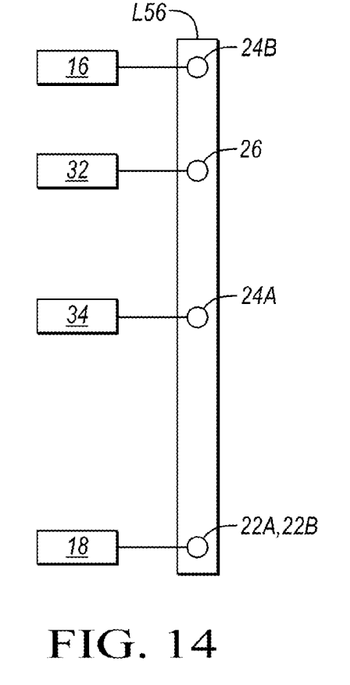
FIG. 14 is a schematic lever diagram of the planetary gearing arrangement of FIG. 13 in collapsed form with the electric machines, the engine, and the final drive connected to the lever diagram.

In FIG. 13, for purposes of illustration only, the planetary gearing arrangement 20B is represented as two levers L5, L6, with the common carrier member 26 represented as a separate node in each of the two levers L5, L6. In general, as known by those skilled in the art, the levers L5, L6 can instead be represented as a four-junction point lever L56, as shown in FIG. 14, with the common carrier member 26, and with the interconnecting member 30 providing a fixed connection, i.e., pairing, between the sun gear members 22A, 22B. With the common carrier member 26 and the interconnecting member 30, the maximum number of separately rotating inertias (about a common central axis) is reduced from six to four, and the total degrees of freedom from four to two. Thus constrained, the planetary gearing arrangement 20B provides, in order of rotational speed, first, second, third, and fourth junction points. However, as understood by those skilled in the art, various compound planetary gearing arrangements may be constructed to provide a four-junction point lever that will accomplish such a result, and place them within the scope of the lever diagram of FIG. 14.

The relative length between the junction points of each planetary gear set lever can be used to represent the ring-to-sun gear ratio of each respective gear set. For example, the length l5 between the nodes representing the second ring gear member 24B and the carrier member 26 is proportional to the number of teeth of the second sun gear member 22B, while the length l6 between the nodes representing the carrier member 26 and the second sun gear member 22B is proportional to the number of teeth of the first ring gear member 24B. Similarly, the length l7 between the nodes representing the first ring gear member 24A and the carrier member 26 is proportional to the number of teeth of the first sun gear member 22A, while the length l8 between the nodes representing the first sun gear member 22A and the carrier member 26 is proportional to the ratio of the number of teeth of the first ring gear member 24A to the number of teeth of the first sun gear member 22A.

Figure 15:
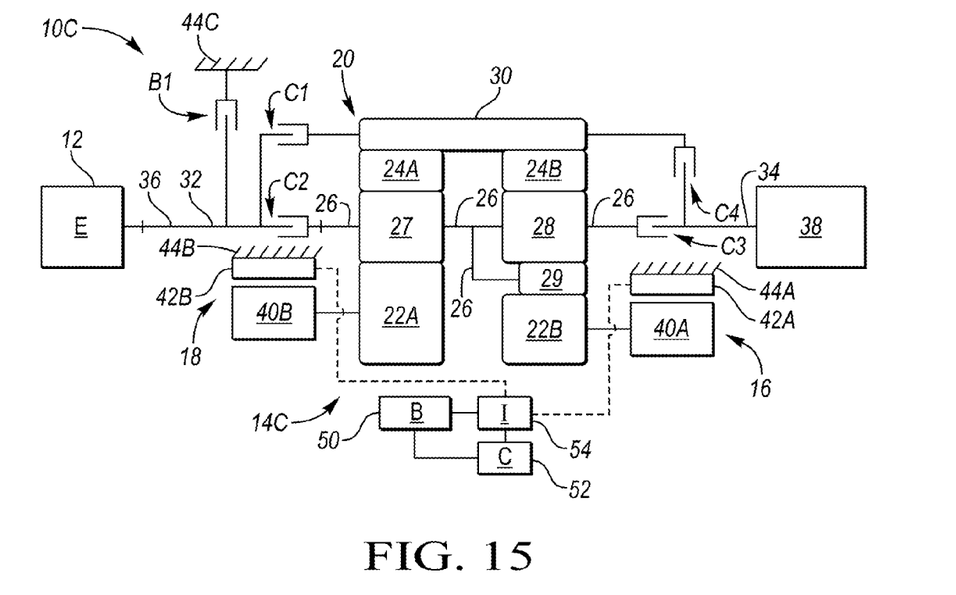
FIG. 15 is a schematic illustration of a fourth embodiment of a powertrain having a planetary gearing arrangement and two electric machines and showing an engine and a final drive.

FIG. 15 shows an alternative embodiment of a powertrain 10C that has the same planetary gearing arrangement 20 as the powertrain 10 of FIG. 1, but has a hybrid transmission 14C that adds four clutches C1, C2, C3, and C4 that enable input and output switching to achieve two different compound-split operating modes. The controller 52 is operatively connected to the clutches C1, C2, C3, and C4 either directly or via a separate transmission controller that interfaces with the controller 52.

Each of the four clutches C1, C2, C3, and C4 is selectively engageable to connect one of the input member 32 and the output member 34 to one of the carrier member 26 and the first ring gear member 24A. More specifically, the first clutch C1 is selectively engageable to connect the input member 32 to rotate in unison with the first ring gear member 24A and the second ring gear member 24B via the interconnecting member 30. The second clutch C2 is selectively engageable to connect the input member 32 to rotate in unison with the carrier member 26. The third clutch C3 is selectively engageable to connect the carrier member 26 to rotate in unison with the output member 34. The fourth clutch C4 is selectively engageable to connect the first ring gear member 24A and the ring gear member 24B via the interconnecting member 30 to rotate in unison with the output member 34.

A first compound-split operating mode is achieved when only the first and the third clutches C1 and C3 are engaged. The brake B1 and the second and fourth clutches C2, C4 are not engaged. The engine 12 is on and drives the first ring gear member 24A via the engaged clutch C1 and the interconnecting member 30. The carrier member 26 drives the output member 34 via the engaged clutch C3, and the electric machines 16, 18 are controlled to operate as motors or generators as necessary to enable the engine 12 to maintain a constant rotational speed while the speed and torque required at the output member 34 varies to meet operator demand.

In a second compound-split operating mode, only the second and the fourth clutches C2 and C4 are engaged, the brake B1 and the first and third clutches C1 and C3 are not engaged. The engine 12 is on and drives the carrier member 26 via the engaged clutch C2. Torque is provided through the planetary gear set 20 from the first ring gear member 24A and the interconnecting member 30 to the engaged clutch C4 to drive the output member 34, and the electric machines 16, 18 are controlled to operate as motors or generators as necessary to enable the engine 12 to maintain a constant rotational speed while the speed and torque required at the output member 34 varies to meet operator demand.

In addition to the compound-split operating mode or modes, and the all-electric operating mode, each of the powertrains 10, 10A, 10B, 10C, and 10D described herein can be operated in many additional operating modes to meet vehicle operating conditions. For example, the powertrains 10, 10A, 10B, 10C, and 10D can be controlled to generate stored energy to replenish the energy storage device 50 while the vehicle is parked (i.e., while the output member 34 is at zero speed). The powertrains 10, 10A, 10B, 10C, and 10D can be launched in an electric-only operating mode in either forward propulsion of the output member 34 (if a hydraulic clutch is applied) or reverse propulsion of the output member 34 (with the brake B1 engaged). The powertrains 10, 10A, 10B, 10C, and 10D can be launched in the compound-split operating mode with the brake B1 disengaged in forward or in reverse. Additionally, the powertrains 10, 10A, 10B, 10C, and 10D can be launched using the engine 12 only, such as in the case of a depleted energy storage device 50, with the brake B1 disengaged. The engine 12 can be started on a grade when the powertrain 10, 10A, 10B, 10C, and 10D is being operated in either forward or reverse by using the electric machines 16, 18 to maintain the required torque at the output member 34. The powertrains 10, 10A, 10B, 10C, and 10D can be controlled to provide a continuous creep on a grade in either forward or reverse. The powertrains 10, 10A, 10B, 10C, and 10D can be controlled to provide regenerative braking in all operating modes during forward propulsion. The powertrains 10, 10A, 10B, 10C, and 10D can supply maximum power quickly from any mode to address a tip-in to wide open throttle operation of the engine 12. A key start using stored energy from the energy storage device 50 to start the engine 12 is also available in any of the powertrains 10, 10A, 10B, and 10C.

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A powertrain comprising:
   a planetary gearing arrangement including:
      two sun gear members;
      two ring gear members;
      a single carrier member; and
      an interconnecting member connecting either the two sun gear members or the two ring gear members to rotate in unison;
   an input member and an output member, one of which is connectable to the carrier member and the other of which is connectable to the first ring gear member to rotate in unison;
   a first electric machine and a second electric machine; wherein the second electric machine is operatively connected to the first sun gear member to drive the first sun gear member, and the first electric machine is operatively connected to drive one of the second ring gear member and the second sun gear member not connected to the interconnecting member;
   a controller operatively connected to the first electric machine and to the second electric machine; and
   a brake selectively engageable to hold the input member stationary;
   wherein the controller is configured to control the first and the second electric machines to function in a compound-split operating mode when the input member is driven and the brake is not engaged, and to function in an all-electric operating mode when the brake is engaged.

2. The powertrain of claim 1, in combination with an engine having an engine output member operatively connectable to the input member to drive the input member when the first and the second electric machines are controlled to function in the compound-split operating mode.

3. The powertrain of claim 1, wherein the first and the second electric machines are controlled to predetermined speeds to cause the input member to be stationary when the brake is engaged.

4. The powertrain of claim 1, wherein:
   the interconnecting member connects the first and the second ring gear members;
   the input member is connectable to the carrier member;
   the output member is connectable to the first ring gear member; and
   the first electric machine is operatively connected to drive the second sun gear member.

5. The powertrain of claim 1, wherein:
   the interconnecting member connects the first and the second ring gear members;
   the output member is connectable to the carrier member;
   the input member is connectable to the first ring gear member; and
   the first electric machine is operatively connected to drive the second sun gear member.

6. The powertrain of claim 1, wherein:
   the interconnecting member connects the first and the second sun gear members;
   the input member is connectable to the carrier member;
   the output member is connectable to the first ring gear member; and
   the first electric machine is operatively connected to drive the second ring gear member.

7. The powertrain of claim 1, further comprising:
   four clutches each selectively engageable to connect one of the input member and the output member to one of the carrier member and the first ring gear member; and
   wherein two of the four clutches are engaged in a first compound-split operating mode, and a different two of the four clutches are engaged in a second compound-split operating mode.

8. The powertrain of claim 1, further comprising:
   a first reduction gear set having:
      a first gear connected to rotate in unison with a first rotor of the first electric machine;
      a second gear connected to rotate in unison with said one of the second ring gear member and the second sun gear member; and
      an idler gear meshing with the both the first gear and the second gear.

9. The powertrain of claim 1, further comprising:
   a reduction gear set having:
      a first gear connected to rotate in unison with a second rotor of the second electric machine;
      a second gear connected to rotate in unison with the first sun gear member; and
      an idler gear meshing with the both the first gear and the second gear.

10. A powertrain comprising:
    a planetary gear arrangement including:
       a first sun gear member;
       a second sun gear member;
       a first ring gear member radially surrounding the first sun gear member;
       a second ring gear member radially surrounding the second sun gear member;
       a carrier member supporting:
          a first set of pinion gears that mesh with the first sun gear member and with the first ring gear member;
          a second set of pinion gears that mesh with the second ring gear member;

a third set of pinion gears that mesh with the second set of pinion gears and with the second sun gear member;
an interconnecting member that connects one of:
the first and the second ring gear members so that the first and the second ring gear members rotate in unison; or
the first and the second sun gear members so that the first and the second sun gear members rotate in unison;
an input member and an output member, one of which is connectable to rotate in unison with the carrier member and the other of which is connectable to rotate in unison with the first ring gear member;
a first electric machine and a second electric machine both of which are selectively operable as a motor or as a generator;
wherein the second electric machine has a second rotor operatively connected to the first sun gear member so that the second rotor drives the first sun gear member when the second electric machine operates as a motor; and
wherein the first electric machine has a first rotor operatively connected to drive one of the second ring gear member and the second sun gear member that is not connected to rotate in unison with the interconnecting member when the first electric machine operates as a motor.

11. The powertrain of claim 10, further comprising:
a controller operatively connected to the first electric machine and to the second electric machine;
a brake selectively engageable to hold the input member stationary; and
wherein the controller controls the first and the second electric machines to function in a compound-split operating mode when the input member is driven and the brake is not engaged, and to function in an all-electric operating mode when the brake is engaged.

12. The powertrain of claim 11, in combination with an engine having an engine output member operatively connectable to the input member to drive the input member when the first and the second electric machines are controlled to function in the compound-split operating mode.

13. The powertrain of claim 11, wherein the first and the second electric machines are controlled to predetermined speeds to cause the input member to be stationary when the brake is engaged.

14. The powertrain of claim 10, wherein:
the interconnecting member connects the first and the second ring gear members so that the first and the second ring gear members rotate in unison;
the input member is connectable to rotate in unison with the carrier member;
the output member is connectable to rotate in unison with the first ring gear member; and
the first rotor is operatively connected to drive the second sun gear member when the first electric machine operates as a motor.

15. The powertrain of claim 10, wherein:
the interconnecting member connects the first and the second ring gear members so that the first and the second ring gear members rotate in unison;
the output member is connectable to rotate in unison with the carrier member;
the input member is connectable to rotate in unison with the first ring gear member; and
the first rotor is operatively connected to drive the second sun gear member when the first electric machine operates as a motor.

16. The powertrain of claim 10, wherein:
the interconnecting member connects the first and the second sun gear members so that the first and the second sun gear members rotate in unison;
the input member is connectable to rotate in unison with the carrier member;
the output member is connectable to rotate in unison with the first ring gear member; and
the first rotor is operatively connected to drive the second ring gear member when the first electric machine operates as a motor.

17. The powertrain of claim 16, further comprising:
a first clutch selectively engageable to connect the input member to rotate in unison with the first ring gear member;
a second clutch selectively engageable to connect the input member to rotate in unison with the carrier member;
a third clutch selectively engageable to connect the carrier member to rotate in unison with the output member;
a fourth clutch selectively engageable to connect the first ring gear member to rotate in unison with the output member; and
wherein the first and the third clutches are engaged in a first compound-split operating mode, and the second and the fourth clutches are engaged in a second compound-split operating mode.

18. The powertrain of claim 10, wherein:
the interconnecting member connects the first and the second sun gear members so that the first and the second sun gear members rotate in unison;
the input member is connectable to rotate in unison with the first ring gear member;
the output member is connectable to rotate in unison with the carrier member; and
the first rotor is operatively connected to drive the second ring gear member when the first electric machine operates as a motor.

19. The powertrain of claim 10, further comprising:
a first reduction gear set having:
a first gear connected to rotate in unison with the first rotor;
a second gear connected to rotate in unison with said one of the second ring gear member and the second sun gear member; and
an idler gear meshing with the both the first gear and the second gear.

20. The powertrain of claim 10, further comprising:
a reduction gear set having:
a first gear connected to rotate in unison with the second rotor;
a second gear connected to rotate in unison with the first sun gear member; and
an idler gear meshing with the both the first gear and the second gear.

* * * * *